United States Patent
Arima et al.

(10) Patent No.: US 7,613,556 B2
(45) Date of Patent: Nov. 3, 2009

(54) VEHICLE STEERING SYSTEM

(75) Inventors: Masanori Arima, Nara (JP); Naoki Maeda, Kashihara (JP); Kosuke Yamanaka, Kashiwara (JP); Atsushi Ishihara, Yamatokoriyama (JP); Tatsuma Kouchi, Kashiwara (JP); Shingo Maeda, Kashiwara (JP); Daisuke Maeda, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 11/760,206

(22) Filed: Jun. 8, 2007

(65) Prior Publication Data

US 2007/0288143 A1 Dec. 13, 2007

(30) Foreign Application Priority Data

Jun. 13, 2006 (JP) ............................. 2006-163748

(51) Int. Cl.
  *B62D 6/00* (2006.01)
  *B62D 1/00* (2006.01)
  *B62D 15/00* (2006.01)
(52) U.S. Cl. ............................ 701/41; 701/23; 701/42; 701/43; 280/443; 280/446
(58) Field of Classification Search ............. 701/23–25, 701/41–43, 70, 72, 301; 180/170, 168, 421–423, 180/443–446
  See application file for complete search history.

(56) References Cited

U.S. PATENT DOCUMENTS 4,926,960 A * 5/1990 Ishikura et al. ............. 180/446
5,765,116 A * 6/1998 Wilson-Jones et al. ........ 701/41
6,198,992 B1 * 3/2001 Winslow ....................... 701/23
6,244,372 B1 * 6/2001 Sakamaki et al. ............ 180/422

(Continued)

FOREIGN PATENT DOCUMENTS

EP 1 462 342 A2 9/2004

(Continued)

OTHER PUBLICATIONS

U.S. Appl. No. 11/758,902, filed Jun. 6, 2007, Maeda et al.

(Continued)

*Primary Examiner*—Jack W. Keith
*Assistant Examiner*—Matthew Lichti
(74) *Attorney, Agent, or Firm*—Oblon, Spivak, McClelland, Maier & Neustadt, L.L.P.

(57) ABSTRACT

In a steering-without-driving state, a larger current limit value, drive limit time and steering angle deviation threshold value are set than when a low-speed driving state occurs. An automatic parking mode is held until a time period over which a state where a motor current value of an electric motor which drives a steering mechanism is equal to the current limit value reaches the drive limit time. Even though the state where the motor current value is equal to the current limit value has continued over the drive limit time, the automatic parking mode is held during the steering angle deviation not exceeding the steering angle deviation threshold value. When the state where the motor current value is equal to the current limit value has continued over the drive limit time Ta and that the steering angle deviation exceeds the threshold value, the automatic parking control is cancelled.

3 Claims, 3 Drawing Sheets

U.S. PATENT DOCUMENTS

| | | |
|---|---|---|
| 6,266,591 B1 * | 7/2001 | Wilson-Jones et al. ........ 701/41 |
| 6,366,842 B1 * | 4/2002 | Kaji et al. ..................... 701/41 |
| 6,408,236 B2 * | 6/2002 | Nishiwaki et al. ............. 701/41 |
| 6,493,619 B2 * | 12/2002 | Kawazoe et al. .............. 701/41 |
| 6,907,333 B2 * | 6/2005 | Iwazaki ........................ 701/41 |
| 7,177,760 B2 * | 2/2007 | Kudo .......................... 701/209 |
| 2001/0016798 A1 * | 8/2001 | Kodaka et al. .............. 701/301 |
| 2004/0098197 A1 * | 5/2004 | Matsumoto et al. ......... 701/301 |
| 2005/0027415 A1 * | 2/2005 | Iwazaki et al. ................ 701/36 |
| 2007/0168093 A1 * | 7/2007 | Nishiyama ................... 701/41 |
| 2007/0282502 A1 * | 12/2007 | Bayer et al. ................... 701/42 |

FOREIGN PATENT DOCUMENTS

| | | |
|---|---|---|
| EP | 1 491 429 A2 | 12/2004 |
| JP | 2001-1930 | 1/2001 |
| JP | 2004-249913 | 9/2004 |

OTHER PUBLICATIONS

U.S. Appl. No. 11/760,402, filed Jun. 8, 2007, Maeda et al.
U.S. Appl. No. 11/760,311, filed Jun. 8, 2007, Arima et al.

* cited by examiner

VEHICLE STEERING SYSTEM

This application is based on and claims a priority from a Japanese Patent Application No. 2006-163748 filed on Jun. 13, 2006, the entire contents of which are incorporated by reference.

BACKGROUND OF THE INVENTION

The present invention relates to a vehicle steering system which can perform an automatic steering control and cancel the control.

There are proposed techniques for performing an automatic steering of a vehicle using a steering actuator provided on the vehicle. For example, a power steering system installed on a vehicle includes an electric motor or a hydraulic actuator as a steering actuator for imparting a steering force (a steering assist force) to a steering mechanism. Then, steered road wheels of the vehicle can be turned by controlling the output of the steering actuator without involving the manipulation of a steering wheel by the driver.

More specifically, in an automatic parking assist control, a target traveling path from a current position to a parking position of the vehicle is calculated, and a relationship of a target turning angle with a traveling distance of the vehicle is obtained so that the vehicle is reversed along the target traveling path so calculated. Then, the steering actuator is controlled based on a steering angle command value which is determined so as to attain a target turning angle according to a traveling distance of the vehicle. As this occurs, the driver only has to perform the adjustment of stopping position as well as the adjustment of vehicle speed by controlling the brake and accelerator pedals and does not have to manipulate the steering wheel.

When the steered road wheel strikes an obstacle such as a curbstone while the automatic parking control is in operation, since the steering actuator cannot steer the steering mechanism, an actual steering angle cannot follow a steering angle command value. In addition to this, in the case of an electric motor being used as the steering actuator, there is generated a state in which a maximum current continues to be supplied to the electric motor, the electric motor being thereby put in an overheat state. Then, in a related art technique disclosed in JP-A-2004-249913, it is determined that a steering disablement state occurs in response to the occurrence of a state in which a steering angle detection value does not reach the steering angle command value and an accumulated time period during which a motor current value is large has reached a predetermined determination time period, thereby the automatic parking control is cancelled in the midst thereof.

For example, when the vehicle is parallel parked in a small space by the automatic parking control, there may occur a case where a "steering-without-driving" in which the steering mechanism is driven in such a state that the vehicle is being stopped is necessary. However, there may occur a case where a long time is necessary until the actual steering angle comes to coincide with the target steering angle when the steering-without-driving is performed due to a shortage of output of the steering actuator. As this occurs, since a state in which a deviation between the actual steering angle and the target steering angle is large continues, in the related art technique, the automatic parking control is cancelled.

On the other hand, JP-A-2001-1930 discloses an automatic steering system in which an automatic steering control is cancelled when a steering-without-driving is performed in order to prevent an overload from being applied to a steering actuator. However, if the steering-without-driving by the automatic steering control cannot be performed, an automatic steering function is easily cancelled in the case the automatic steering control is desired especially at the time of parallel parking of the vehicle.

Thus, in the conventional automatic steering functions, there is a tendency that the automatic steering control is easily cancelled when the steering-without-driving is performed, and those conventional automatic steering functions have not been easy to handle.

SUMMARY OF THE INVENTION

Then, the invention was made in view of the situations, and an object thereof is to provide a vehicle steering system which can suppress the cancellation of the automatic steering control when the steering-without-driving is performed and in which the automatic steering function is made easy to handle.

With a view to attaining the object, according to a first aspect of the invention, there is provided a vehicle steering system including: a steering actuator (M) for imparting a steering force to a steering mechanism (1) of a vehicle; an automatic steering controller (22) for performing an automatic steering control by controlling the steering actuator based on a target steering angle; a steering-without-driving determination unit (25, S1) for determining whether or not a steering-without-driving in which the steering mechanism performs a steering operation in such a state that the vehicle is being stopped occurs during the automatic steering control by the automatic steering controller; a threshold value setting unit (24, S2, S6) for setting a threshold value for canceling the automatic steering control by the automatic steering controller, the threshold value being set so that the automatic steering control is made more difficult to be cancelled at the time the steering-without-driving determination unit determines that the steering-without-driving occurs as compared with at the time the steering-without-driving determination unit determines that the steering-without-driving does not occur; and an automatic steering cancellation unit (24, S3-S5, S7, S8) for canceling the automatic steering control by the automatic steering control unit based on the threshold value set by the threshold value setting unit.

Note that parenthesized numerals, numerals with a character and characters denote corresponding constituent elements in an embodiment of the invention which will be described later on, and this will be true in the following paragraphs related to this section.

According to the configuration that has been described above, since the automatic steering control is made difficult to be cancelled in such a state that the steering-without-driving occurs, the automatic steering control is allowed to continue to give an effective assist to the driving of the vehicle when the vehicle is longitudinally parked, in which the steering-without-driving becomes effective. On the other hand, since the automatic steering control is cancelled based on the threshold value even in such a state that the steering-without-driving occurs, the steering actuator can be protected against the overload state. In this way, while realizing the protection of the steering actuator, the ease with which the automatic steering function is handled can be increased.

According to a second aspect of the invention, there is provided a vehicle steering system as set forth in the first aspect of the invention, further including an actuator drive value obtaining unit (32) for obtaining a drive value for the steering actuator, in which the threshold value setting unit includes a drive limit value setting unit (S2, S6) for variably setting a drive limit value (A, B) for the steering actuator, the drive limit setting unit sets the drive limit value larger at the time the steering-without-driving determination unit determines that the steering-without-driving occurs as compared with that at the time the steering-without-driving determination unit determines that the steering-without-driving does not occur, and the automatic steering cancellation unit cancels the automatic steering control by the automatic steering controller on condition that the drive value obtained by the actuator drive value obtaining unit reaches the drive limit value set by the drive limit value setting unit.

According to the configuration that has been described above, the drive limit value which is a threshold value related to the drive value of the steering actuator is set larger at the time the steering-without-driving state occurs as compared with that at the time the steering-without-driving state is not occurring, whereby since the steering actuator is allowed to be driven at a larger drive value when the steering-without-driving state occurs, a sufficient drive force for steering-without-driving can be given to the steering mechanism.

According to a third aspect of the invention, there is provided a vehicle steering system as set forth in the second aspect of the invention, in which the threshold value setting unit includes a drive limit time setting unit (S2, S6) for variably setting a drive limit time (Ta, Tb) which is a limit time during which the steering actuator is kept driven at the drive limit value, the drive limit time setting unit sets the drive limit time longer at the time the steering-without-driving unit determines that the steering-without-driving occurs as compared with that at the time the steering-without-driving determination unit determines that the steering-without-driving does not occur, and the automatic steering cancellation unit cancels the automatic steering control by the automatic steering controller on condition that a time period over which the actuator is kept driven at the drive limit value reaches a drive limit time set by the drive limit time setting unit.

According to the configuration that has been described above, the steering actuator is allowed to be kept driven over a longer time period when the steering-without-driving state occurs than when the steering-without-driving state does not occur, whereby the steering-without-driving by the automatic steering control is ensured to be performed.

According to a fourth aspect of the invention, there is provided a vehicle steering system as set forth in any of the first to third aspects of the invention, further including a steering angle detector (17) for detecting an actual steering angle of the steering mechanism, in which the threshold value setting unit includes a deviation threshold value setting unit (S2, S6) for variably setting a deviation threshold value (α, β) related to a steering angle deviation which is a deviation of an actual steering angle detected by the steering angle detector relative to the target steering angle, the deviation threshold value setting unit sets the deviation threshold value larger at the time the steering-without-driving determination unit determines that the steering-without-driving occurs as compared with that at the time the steering-without-driving determination unit determines that steering-without-driving does not occur, and the automatic steering cancellation unit cancels the automatic steering control by the automatic steering controller on condition that the steering angle deviation exceeds a deviation threshold value set by the deviation threshold value setting unit.

According to the configuration that has been described above, a larger steering angle deviation is permitted when the steering-without-driving state occurs than when the steering-without-driving state does not occur. Because of this, for example, even if there occurs a shortage of output of the steering actuator when the steering-without-driving state is occurring so that the actual steering angle is not allowed to follow the target steering angle without any delay, the automatic steering control is allowed to continue.

DETAILED DESCRIPTION OF PREFERRED EMBODIMENTS

Hereinafter, embodiments of the invention will be described in detail with reference to the accompanying drawings.

Figure 1:
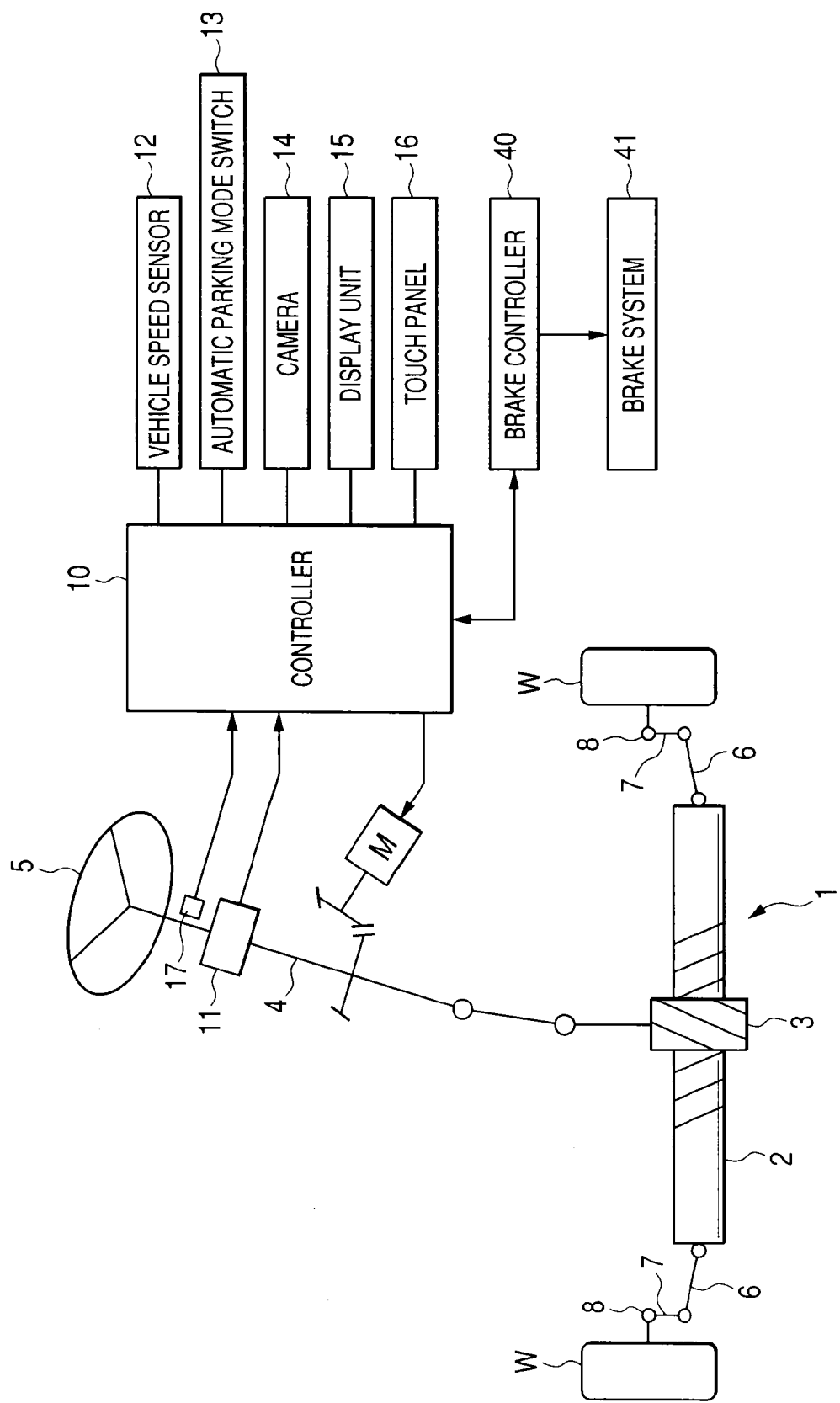
FIG. 1 is a conceptual diagram which describes the configuration of an electric power steering system which constitutes an embodiment of a vehicle steering system of the invention.

FIG. 1 is a conceptual diagram which describes the configuration of an electric power steering system as a vehicle steering system according to an embodiment of the invention. The electric power steering system is configured such that torque generated by an electric motor M functioning as a steering actuator is transmitted to a steering mechanism 1 for turning steered road wheels W (for example, left and right front road wheels) of a vehicle. The steering mechanism 1 is a rack-and-pinion type steering mechanism which includes a rack shaft 2 which extends along a lateral direction of the vehicle and a pinion 3 which meshes with a gear portion of the rack shaft 2. One end of a steering shaft 4 is connected to the pinion 3, while a steering wheel 5 functioning as a control member is connected to the other end of the steering shaft 4. Consequently, when the steering wheel 5 is manipulated to rotate, the rotation of the steering wheel 5 is transmitted to the rack shaft 2 via the steering shaft 4 and the pinion 3 so as to be transformed into an axial displacement of the rack shaft 2.

Ends of a pair of tie rods 6 are connected to ends of the rack shaft 2, respectively. The other ends of the pair of tie rods 6 are connected to ends of a pair of knuckle arms 7, respectively. The pair of knuckle arms 7 are supported rotatably round a pair of king pins 8, respectively, and are connected to the pair of steered road wheels W via the king pins 8, respectively. In this configuration, when the rack shaft 2 is displaced in an axial direction, the knuckle arms 7 rotate round the king pins 8, respectively, whereby the steered wheels are turned.

In order to impart a proper steering force to the steering mechanism 1, a controller (an ECU: Electronic Control Unit) 10 is provided for controlling the electric motor M. The controller 10 is designed to receive output signals which are inputted thereinto from a torque sensor 11 for detecting a manipulating torque imparted to the steering wheel 5, a manipulating angle sensor 17 for detecting a manipulating angle of the steering wheel 5 by detecting a rotational angle of the steering shaft 4, and a vehicle speed sensor 12 for detecting a vehicle speed of the vehicle on which the electric power steering system is installed. In addition, an output of an automatic parking mode switch 13 for setting and canceling an automatic parking mode is further given to the controller 10. A video signal is inputted into the controller 10 from a camera 14 for sensing an image at the rear of the vehicle. Furthermore, a display unit 15 (for example, a liquid crystal display unit or other graphic display unit) which is disposed in the vicinity of a driver's seat of the vehicle is connected to the controller 10. An output signal of a touch panel 16 provided on a display screen of the display unit 15 is designed to be inputted into the controller 10. Furthermore, a brake controller (ECU: Electronic Control Unit) for controlling a brake system 41 of the vehicle is also connected to the controller 10.

When the automatic parking mode is instructed to be performed by manipulation of the automatic parking mode switch 13, the controller 10 controls the electric motor M according to the automatic parking mode in which a steering control (an automatic parking control) is performed for automatic parking of the vehicle. In addition, when a cancellation of the automatic parking mode is instructed by manipulation of the automatic parking mode switch 13, the controller 10 cancels the automatic parking control and controls the electric motor M according to an assist mode. The assist mode means a control mode for causing the electric motor M to generate a steering assisting force to assist the driver in manipulating the steering wheel 5 based on a manipulating torque detected by the torque sensor 11 and a vehicle speed detected by the vehicle speed sensor 12.

Figure 2:
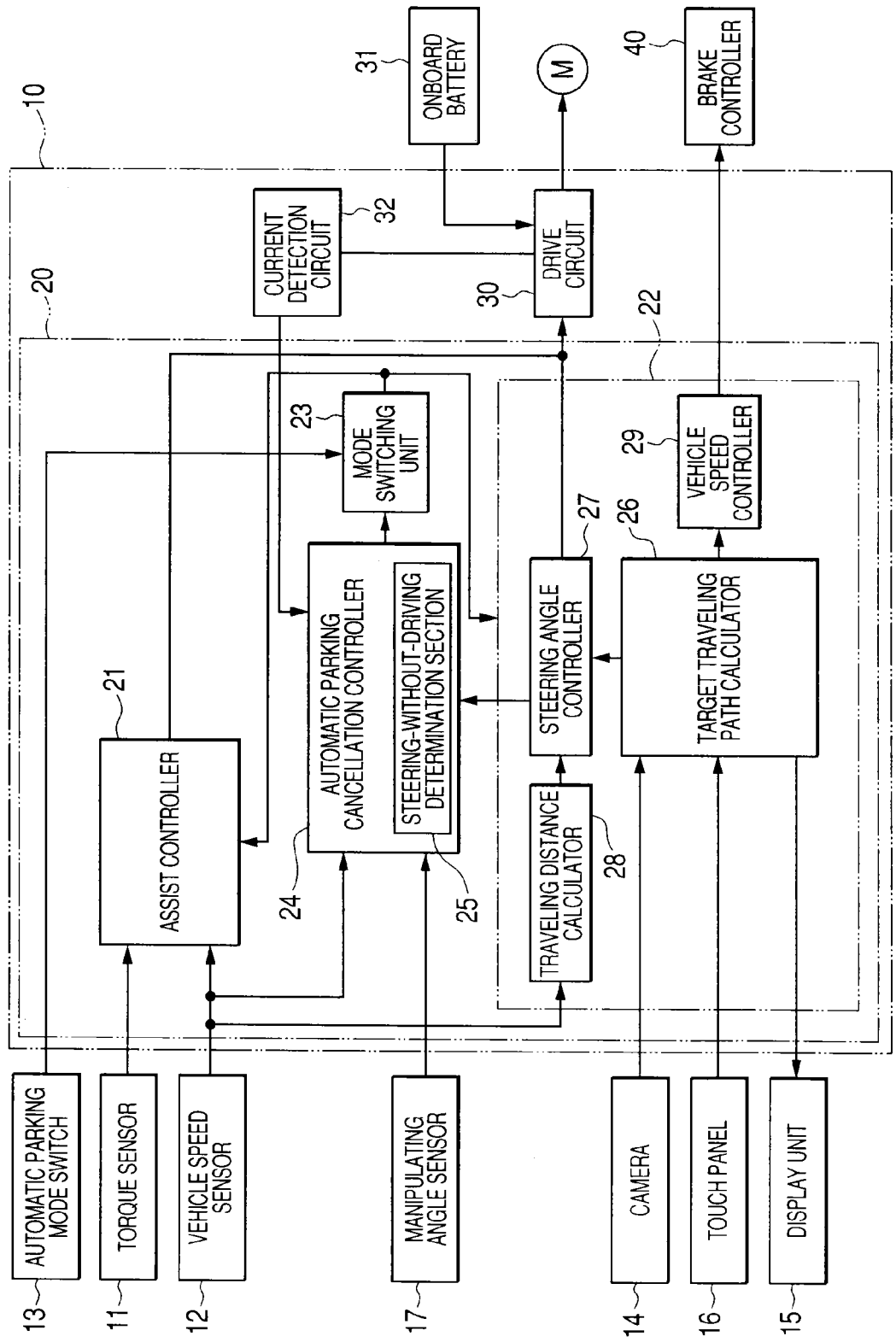
FIG. 2 is a block diagram which describes an electrical configuration of a controller provided in the vehicle steering system.

FIG. 2 is a block diagram which describes an electrical configuration of the controller 10. The controller 10 includes a microcomputer 20 and a drive circuit 30 for supplying electric power from an onboard battery 31 to the electric motor M, and a current detection circuit 32 for detecting a motor current supplied from the drive circuit 30 to the electric motor M.

The microcomputer 20 includes a CPU (Central Processing Unit) and a memory (ROM, RAM and the like) and performs functions of a plurality of functional processing units. The functional processing units include an assist controller 21 for controlling the electric motor M according to the assist mode, an automatic parking controller 22 for controlling the electric motor M according to the automatic parking mode, a mode switching unit 23 for switching the mode of the electric power steering system between the automatic parking mode and the assist mode, and an automatic parking cancellation controller 24 for canceling the automatic parking control by the automatic parking controller 22 so as to shift the mode of the electric power steering system from the automatic parking mode to the assist mode when a predetermined condition is established.

The mode switching unit 23 selects a control by either of the assist controller 21 or the automatic parking controller 22 and makes the control so selected effective, whereby the automatic parking mode and the assist mode are switched therebetween. The mode switching unit 23 not only switches the control mode according to the setting by the automatic parking mode switch 13 but also switches the control mode from the automatic parking mode to the assist mode according to an instruction from the automatic parking cancellation controller 24 during the automatic parking mode.

Since the manipulating angle sensor 17 detects a manipulating angle of the steering wheel 5 which is mechanically connected to the steering mechanism 1, the manipulating angle sensor 17 also detects an actual steering angle (an actual turning angle) of the steering mechanism 1 at the same time as the detection of a manipulating angle of the steering wheel 5.

The automatic parking cancellation controller 24 determines whether or not the automatic parking mode is to be cancelled based on a motor current detected by the current detection circuit 32, an actual steering angle detected by the manipulating angle sensor 17, and a target steering angle set by the automatic parking controller 22, and gives to the mode switching unit 23 an automatic parking cancellation instruction which represents a cancellation of the automatic parking mode when the cancellation is determined to be made.

The automatic parking cancellation controller 24 also includes a steering-without-driving determination section 25 for determining whether or not a steering-without-driving state occurs based on whether or not the vehicle speed is zero by referring to an output from the vehicle speed sensor when the automatic parking mode is in effect. The automatic parking cancellation controller 24 variably sets determination threshold values for canceling the automatic parking mode depending upon whether or not the steering-without-driving determination section 25 determines that a steering-without-driving state occurs. The determination threshold values include values of an operating characteristic of the electric motor M, such as a current limit value which is a maximum allowable value of motor current as a drive value of the electric motor M, or a drive limit time which is a longest time period over which the electric motor M is permitted to be kept driven at the current limit value. The determination threshold values also include a steering angle deviation threshold value which is a maximum allowable value of a deviation (a steering angle deviation) of an actual steering angle relative to a target steering angle. These determination threshold values are set larger when the steering-without-driving state is determined to occur than when the steering-without-driving state is not determined to occur so that the automatic parking control is made difficult to be cancelled when the steering-without-driving state is determined to occur.

More specifically, when the automatic parking mode is in effect, the current limit value is switched between a first value A (for example, A=60 amperes) and a second value B (<A, for example, B=55 amperes) which is smaller than the first value A in such a manner that the larger current limit value A (the first value) is used when the steering-without-driving state occurs while the smaller current limit value B (the second value) is used when the steering-without-driving state does not occur (or when the vehicle is being driven at low speeds). When the assist mode is in effect, the assist controller 21 uses a third value C (<B, for example, C=50 amperes) which is smaller than the second value B as a current limit value for detecting the overload of the electric motor M.

In addition, when the automatic parking mode is in effect, the drive limit time is switched between a first time period Ta (for example, Ta=5 seconds) and a second time period Tb (<Ta, for example, Tb=4.5 seconds) which is shorter than the first time period Ta in such a manner that the longer drive limit time Ta (the first time period) is used when the steering-without-driving state occurs while the shorter drive limit time Tb (the second time period) is used when the steering-without-driving state does not occur (or when the vehicle is being driven at low speeds). When the assist mode is in effect, the assist controller 21 uses a third time period Tc (<Tb, for example, Tc=4.0 seconds) which is shorter than the second time period Tb as a drive limit time for detecting the overload of the electric motor M.

When the automatic parking mode is in effect, the steering angle deviation threshold value is switched between a first value α (for example, α=10 degrees) and a second value β (<α, for example, β=5 degrees) which is smaller than the first value α in such a manner that the larger steering angle deviation threshold value α is used when the steering-without-driving state occurs while the smaller steering angle deviation threshold value β is used when the steering-without-driving state does not occur (or when the vehicle is being driven at low speeds).

The assist controller 21 determines a motor target current value which corresponds to a manipulating torque detected by the torque sensor 11 and a vehicle speed detected by the vehicle speed sensor 12. More specifically, the assist controller 21 sets a motor target current value according to an assist characteristic which determines a motor target current value which corresponds to the manipulating torque and the vehicle speed and controls the electric motor M via the drive circuit 30 so that the motor target current value is attained. The assist characteristic is stored in advance in the memory within the microcomputer 20 in the form of a map (a table), for example. This assist characteristic is determined such that for example, the motor target current value is set larger as the absolute value of the manipulating torque becomes larger and the motor target current value is set smaller as the vehicle speed becomes faster.

The automatic parking controller 22 includes a target traveling path calculator 26 for calculating a target traveling path from a current position to a target parking position of the vehicle, a steering angle controller 27 for controlling a steering angle according to the target traveling path calculated by the target traveling path calculator 26, a traveling distance calculator 28 for calculating a traveling distance based on an output signal of the vehicle speed sensor 12, and a vehicle speed controller 29 for limiting the vehicle speed while the automatic parking control is in operation.

The target traveling path calculator 26 calculates a target traveling path based on a video image sensed by the camera 14 and an input from the touch panel 16. More specifically, when the driver manipulates the automatic parking mode switch 13 to designate the automatic parking mode, a video image outputted by the camera 14 is displayed on the display unit 15. Then, the driver designates a desired parking position from the touch panel 16 by referring to the video image displayed on the display unit 15. Consequently, at this time, the touch panel 16 functions as a parking position designation device. When the parking position is designated in this way, the target traveling path calculator 26 calculates a positional relationship between the current position of the subject vehicle and the designated parking position and furthermore obtains a path which avoids an obstacle that is recognized from the video image sensed by the camera 114 as a target traveling path. The traveling path so calculated may be displayed on the display unit 15.

The target traveling path calculator 26 stores information on the target traveling path in the memory in the form of steering control table data which is table data which represents a relationship between a traveling distance over which the vehicle travels from the current position to the target parking position thereof and a steering angle corresponding to the traveling distance. The steering angle controller 27 controls the electric motor M by referring to the steering control table data. Namely, the steering angle controller 27 obtains a target steering angle corresponding to a traveling distance of the vehicle which is inputted from the traveling distance calculator 28 from the steering control table data based on the traveling distance. The steering angle controller 27 controls the electric motor M via the drive circuit 30 so that the target steering angle so obtained is attained.

The vehicle speed controller 29 determines a vehicle speed upper limit value and monitors an output of the vehicle speed sensor 12 so as to issue a brake application request to a brake controller 40 when the vehicle speed reaches the vehicle speed upper limit value. In response to this, the brake controller 40 controls the brake system 41 (refer to FIG. 1) so as to suppress the vehicle speed to stay below the vehicle speed upper limit value.

While the automatic parking is in effect, basically, the driver does not manipulate the steering wheel but manipulates the accelerator pedal and the brake pedal so as to adjust the speed of the vehicle, as well as to adjust a stopping position. While this is being performed, the steering angle of the steering mechanism 1 is automatically adjusted every moment by the electric motor M which is controlled by the automatic parking controller 22. In addition, when the vehicle speed reaches the vehicle speed upper limit value, the brake controller 40 intervenes in the adjustment of vehicle speed by the driver, so as to perform a speed reduction control.

Figure 3:
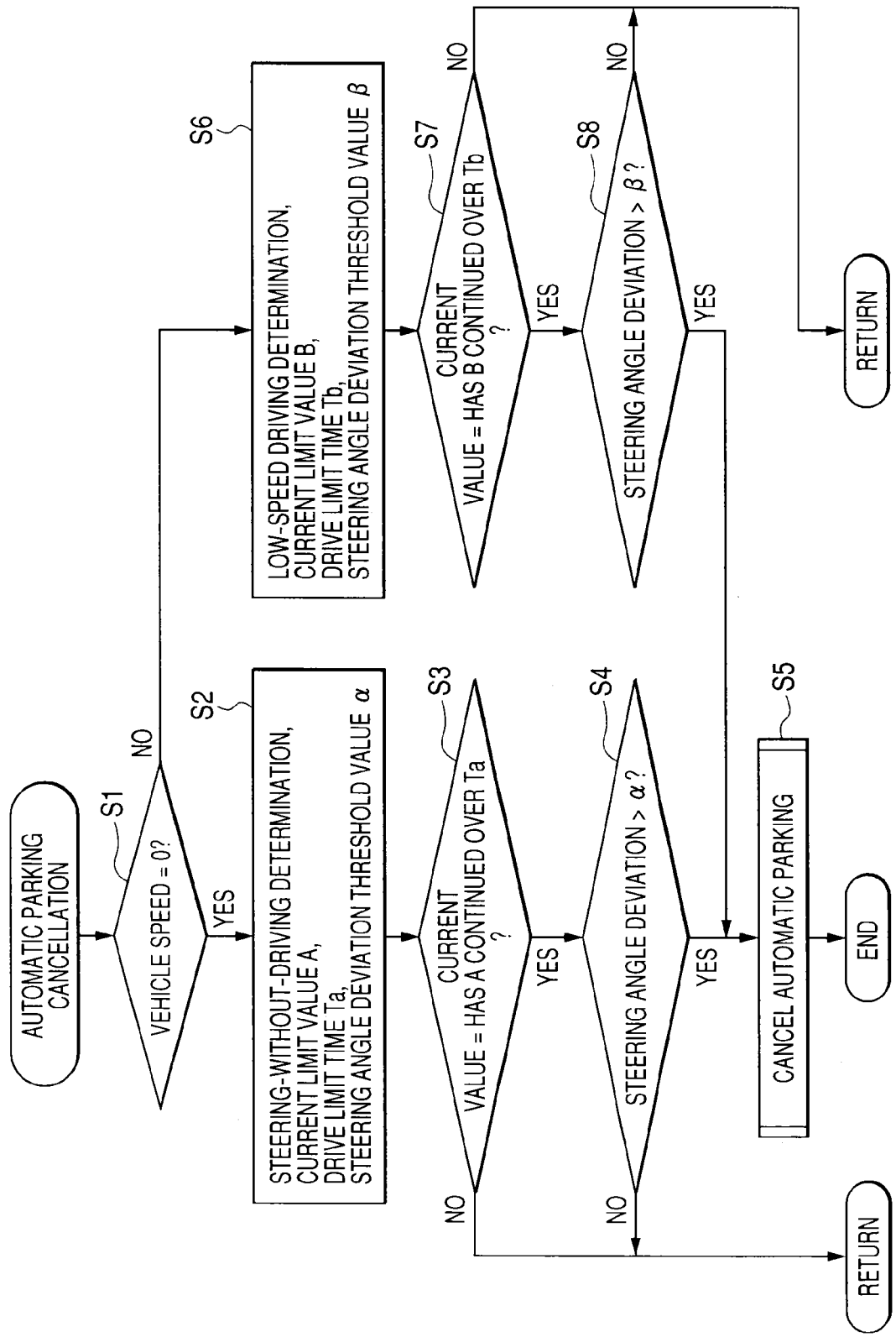
FIG. 3 is a flowchart which describes the operation of an automatic parking cancellation controller provided in the controller.

FIG. 3 is a flowchart which describes an operation which is performed repeatedly on a predetermined control cycle by the automatic parking cancellation controller 24 during the automatic parking mode. The steering-without-driving state determination section 25 provided in the automatic parking cancellation controller 24 determines whether or not a state in which the steering mechanism 1 is caused to perform an automatic steering in such a state that the vehicle is being stopped, that is, the steering-without-driving state occurs based on whether or not a vehicle speed detected by the vehicle speed sensor 12 is zero (step S1). If the vehicle speed is zero, it is determined that the steering-without-driving state occurs (step S1: YES), the automatic parking cancellation controller 24 sets the current limit value to the first value A, sets the drive limit time to the first time period Ta, and sets the steering angle deviation threshold value to the first value α (step S2). Furthermore, the automatic parking cancellation controller 24 judges whether or not a state where the motor current detected by the current detection circuit 32 is equal to or greater than the current limit value A has continued over the drive limit time Ta (step S3). If the judgment is negative, the automatic parking cancellation controller 24 does not execute processes in steps onward in the flowchart shown in FIG. 3, and the flow returns, whereby the automatic parking mode is held. On the contrary, the judgment in step S3 is positive, the automatic parking cancellation controller 24 obtains a target steering angle from the steering angle controller 27, and further obtains a deviation (a steering angle deviation) of an actual steering angle detected by the manipulating angle sensor 17 relative to the target steering angle for comparison of the steering angle deviation so obtained with the steering angle deviation threshold value α (step S4). If the steering angle deviation does not exceed the steering angle deviation threshold value α (step S4: NO), the automatic parking cancellation controller 24 does not execute processes in steps onward in the flowchart shown in FIG. 3, and the flow returns, whereby the automatic parking mode is held. On the contrary, if the steering angle deviation exceeds the steering angle deviation threshold value α (step S4: YES), the automatic parking cancellation controller 24 issues an automatic parking cancellation instruction to the mode switching unit 23 (step S5). In response to this, the mode switching unit 23 switches the control mode to the assist mode.

If judging in step S1 that the vehicle speed is not zero, and hence, the steering-without-driving state does not occur but a low-speed driving state occurs (step S1: NO), the automatic parking cancellation controller 24 sets the current limit value to the second value B, sets the drive limit time to the second time period Tb, and sets the steering angle deviation threshold value to the second value β (step S6). Furthermore, the automatic parking cancellation controller 24 judges whether or not a state where the motor current detected by the current detection circuit 32 is equal to or greater than the current limit value B has continued over the drive limit time Tb (step S7). If the judgment is negative, the automatic parking cancellation controller 24 does not execute processes in steps onward in the flowchart shown in FIG. 3, and the flow returns, whereby the automatic parking mode is held. On the contrary, the judgment in step S7 is positive, the automatic parking cancellation controller 24 obtains a target steering angle from the steering angle controller 27, and further obtains a deviation (a steering angle deviation) of an actual steering angle detected by the manipulating angle sensor 17 relative to the target steering angle for comparison of the steering angle deviation so obtained with the steering angle deviation threshold value β (step S8). If the steering angle deviation does not exceed the steering angle deviation threshold value β (step S8: NO), the automatic parking cancellation controller 24 does not execute processes in steps onward in the flowchart shown in FIG. 3, and the flow returns, whereby the automatic parking mode is held. On the contrary, if the steering angle deviation exceeds the steering angle deviation threshold value β (step S8: YES), the automatic parking cancellation controller 24 issues an automatic parking cancellation instruction to the mode switching unit 23 (step S5). In response to this, the mode switching unit 23 switches the control mode to the assist mode.

In this way, according to the embodiment, since the current limit value, the drive limit time and the steering angle deviation threshold value are all set to the larger values in the steering-without-driving state, the automatic parking mode can be held while the electric motor M is allowed to be driven longer at the larger current value and the larger steering angle deviation is allowed as compared with the case where the steering-without-driving state does not occur. In this way, since the cancellation of automatic parking control at the time of steering-without-driving can be suppressed, usability of the automatic parking function is improved. Namely, the automatic parking mode can be used for effectively assisting in driving the vehicle in the case that utilization of the steering-without-driving is effective such as parallel parking.

In addition, since the automatic parking control is cancelled according to the results of the determination using the current limit value A, the drive limit time Ta and the steering angle deviation threshold value α even when the steering-without-driving state occurs, the electric motor M can properly be protected against a failure due to overheat.

While the embodiment of the invention has been described heretofore, the invention can be implemented in other forms. For example, while in the embodiment that has been described above, the manipulating angle sensor 17 for detecting the manipulating angle of the steering wheel 5 as the control member is used for detecting the actual steering angle of the steering mechanism 1, the actual steering angle can be detected by the use of an output from a rack traveling amount sensor for detecting a traveling amount of the rack shaft 2, or the actual steering angle can be detected by detecting a rotational angle of the electric motor M.

Furthermore, while in the embodiment that has been described above, the invention is described as being applied to the electric power steering system, the invention can be widely applied to vehicle steering systems in which a steering actuator is provided for imparting a steering force to a steering mechanism of a vehicle. These vehicle steering systems include a so-called steer-by-wire system, a hydraulic power steering system and the like. The steer-by-wire system means a system in which a mechanical connection between a control member such as a steering wheel or the like and a steering mechanism is eliminated, so that a manipulating amount of the control member is detected by a sensor and a driving force of a steering actuator which is controlled according to an output from the sensor is transmitted to the steering mechanism.

In addition, while in the embodiments, the automatic parking control is employed as the example of the automatic steering control, the invention can also be applied to other types of automatic steering controls such as an automatic steering control for causing a vehicle to be driven automatically along a driving lane.

The embodiments described above are to be regard as illustrative rather than restrictive. Variations and changes may be made by others, and equivalents employed, without departing from spirit of the present invention. Accordingly, it is intended that all variations, changes and equivalents which fall within the spirit and scope of the present invention as defined in the claims be embraced thereby.

What is claimed is:

1. A vehicle steering system comprising:
    a vehicle steering mechanism including a manual steering element that receives a driver steering force;
    a steering actuator comprising an electric motor configured to impart a steering force to the steering mechanism independent of the manual steering element;
    an automatic steering controller configured to perform an automatic steering control by controlling the steering actuator based on a target steering angle;
    a steering-without-driving determination unit configured to determine the presence of a steering-without-driving condition in which the steering mechanism performs a steering operation while the vehicle is stopped during the automatic steering control by the automatic steering controller;
    a threshold value setting unit configured to set a threshold value of at least an operating characteristic of the steering actuator, for canceling the automatic steering control by the automatic steering controller, the threshold value being set so that the automatic steering control is made more difficult to be cancelled at the time the steering-without-driving determination unit determines that the steering-without-driving occurs as compared with at the time the steering-without-driving determination unit determines that the steering-without-driving does not occur; and
    an automatic steering cancellation unit configured to cancel the automatic steering control by the automatic steering control unit based on the threshold value set by the threshold value setting unit,
    wherein the operating characteristic of the steering actuator include a drive limit value of the steering actuator, the drive limit value of the steering actuator comprising a current limit value which is a maximum allowable value of the motor current, further comprising an actuator drive value obtaining unit configured to obtain a value of an electric current corresponding to a drive value for the steering actuator,
    wherein the threshold value setting unit includes a drive limit value setting unit is configured to variably set a drive limit value for the steering actuator,
    wherein the drive limit setting unit is configured to set the drive limit value larger at the time the steering-without-driving determination unit determines that the steering-without-driving occurs as compared with that at the time the steering-without-driving determination unit determines that the steering-without-driving does not occur, and
    wherein the automatic steering cancellation unit is configured to cancel the automatic steering control by the automatic steering controller on condition that the drive value obtained by the actuator drive value obtaining unit reaches the drive limit value set by the drive limit value setting unit.

2. The vehicle steering system according to claim 1, wherein
    the threshold value setting unit includes a drive limit time setting unit configured to variably set a drive limit time which is a limit time during which the steering actuator is kept driven at the drive limit value,
    the drive limit time setting unit is configured to set the drive limit time longer at the time the steering-without-driving unit determines that the steering-without-driving occurs as compared with that at the time the steering-without-driving determination unit determines that the steering-without-driving does not occur, and the automatic steering cancellation unit is configured to cancel the automatic steering control by the automatic steering controller on condition that a time period over which the actuator is kept driven at the drive limit value reaches a drive limit time set by the drive limit time setting unit.

3. The vehicle steering system according to claim 2 further comprising a steering angle detector configured to detect an actual steering angle of the steering mechanism, wherein the threshold value setting unit includes a deviation threshold value setting unit configured to variably set a deviation threshold value related to a steering angle deviation which is a deviation of an actual steering angle detected by the steering angle detector relative to the target steering angle, wherein the deviation threshold value setting unit is configured to set the deviation threshold value larger at the time the steering-without-driving determination unit determines that the steering-without-driving occurs as compared with that at the time the steering-without-driving determination unit determines that steering-without-driving does not occur, and wherein the automatic steering cancellation unit is configured to cancel the automatic steering control by the automatic steering controller on condition that the time period over which the actuator is kept driven at the drive limit value reaches the drive limit time set by the drive limit time setting unit, and the steering angle deviation exceeds a deviation threshold value set by the deviation threshold value setting unit.

* * * * *